(12) United States Patent  
Morita

(10) Patent No.: US 11,599,074 B2  
(45) Date of Patent: Mar. 7, 2023

(54) POWER INFORMATION MANAGEMENT DEVICE AND POWER INFORMATION MANAGEMENT SYSTEM

(71) Applicant: Hiroyuki Morita, Tokyo (JP)

(72) Inventor: Hiroyuki Morita, Tokyo (JP)

(*) Notice: Subject to any disclaimer, the term of this patent is extended or adjusted under 35 U.S.C. 154(b) by 445 days.

(21) Appl. No.: 16/732,437

(22) Filed: Jan. 2, 2020

(65) Prior Publication Data

US 2020/0209814 A1 Jul. 2, 2020

Related U.S. Application Data

(63) Continuation of application No. PCT/JP2018/025271, filed on Jul. 3, 2018.

(30) Foreign Application Priority Data

Jul. 4, 2017 (JP) .............................. JP2017-130849

(51) Int. Cl.
*G05B 13/04* (2006.01)
*G05F 1/66* (2006.01)
*G06F 1/26* (2006.01)

(52) U.S. Cl.
CPC ............. *G05B 13/042* (2013.01); *G05F 1/66* (2013.01); *G06F 1/26* (2013.01)

(58) Field of Classification Search
CPC ........ G05B 13/042; G05F 1/66; G06Q 50/06; H02J 13/00002; H02J 13/00006;

(Continued)

(56) References Cited

U.S. PATENT DOCUMENTS

2006/0259447 A1* 11/2006 Kings .................... G01D 4/004  
    705/412  
2012/0060044 A1* 3/2012 Jonsson ............ H02J 13/00016  
    713/340

(Continued)

FOREIGN PATENT DOCUMENTS

EP         3176899 A1    6/2017  
JP        2001-169479 A   6/2001

(Continued)

OTHER PUBLICATIONS

International Search Report issued in PCT/JP2018/025271 dated Sep. 18, 2018 with English Translation (4 pages).

(Continued)

*Primary Examiner* — Yuhui R Pan  
(74) *Attorney, Agent, or Firm* — Nakanishi IP Associates, LLC

(57) ABSTRACT

The power information management device is directly or indirectly connected to a communication network and is provided with: wiring that transmits power; a power measurement unit that measures an amount and a direction of the power transmitted through the wiring; a power information generation unit that generates, on a predetermined period basis, power information that represents the amount and the direction of the power measured by the power measurement unit; and a communication unit that transmits the power information to the communication network, wherein a load unit, a power generation unit and a power storage unit are directly or indirectly connectable to the wiring.

12 Claims, 7 Drawing Sheets

(58) Field of Classification Search
CPC ..... H02J 13/00016; H02J 3/008; Y02B 90/20; Y02E 60/00; Y04S 10/30; Y04S 20/00; Y04S 40/12; Y04S 40/124; Y04S 50/10; G06F 1/26
See application file for complete search history.

(56) References Cited

U.S. PATENT DOCUMENTS

| | | |
|---|---|---|
| 2013/0238266 A1 | 9/2013 | Savvides et al. |
| 2014/0114849 A1* | 4/2014 | Forbes, Jr. ............. G05D 17/00 705/40 |
| 2014/0249688 A1 | 9/2014 | Ansari et al. |
| 2015/0061644 A1* | 3/2015 | Parks .................. G01R 1/0408 324/126 |
| 2016/0162000 A1 | 6/2016 | Fujiwara et al. |
| 2017/0146576 A1 | 5/2017 | Sawides et al. |
| 2018/0205226 A1 | 7/2018 | Kim |
| 2018/0212427 A1 | 7/2018 | Niikura |

FOREIGN PATENT DOCUMENTS

| | | |
|---|---|---|
| JP | 2015-219202 A | 12/2015 |
| JP | 2016-039652 A | 3/2016 |
| JP | 2017-022919 A | 1/2017 |
| KR | 20120034890 A | 4/2012 |
| WO | 2012-081312 A1 | 6/2012 |
| WO | 2017/043855 A1 | 3/2017 |

OTHER PUBLICATIONS

Office Action issued in Japanese Patent Application No. 2019-527729 dated Mar. 17, 2020, with English Translation (4 pages).
European Search Report issued in European Patent Application No. 18827923.6, dated Mar. 12, 2020 (8 pages).

* cited by examiner

POWER INFORMATION MANAGEMENT DEVICE AND POWER INFORMATION MANAGEMENT SYSTEM

CROSS-REFERENCE TO RELATED APPLICATION(S)

This application is a continuation application of PCT International Application No. PCT/JP2018/025271 filed on Jul. 3, 2018, which designated the United States, and which claims the benefit of priority from Japanese Patent Application No. 2017-130849, filed on Jul. 4, 2017. The entire contents of these applications are incorporated herein by reference.

BACKGROUND OF THE INVENTION

Field of the Invention

The present invention relates to power information management technology for managing information on power supply and consumption.

Description of the Related Art

The power (electric power) consumed in urban areas has conventionally been generated and subjected to voltage conversion at power plants in areas that are remote from urban areas, such as mountain areas and coastal areas, and then conveyed to urban areas through power lines. It is said that the power loss caused by transmission amounts to a substantial percentage when, for example, transmitting from mountain areas to urban areas.

On the other hand, various power generators, such as solar power generators or small-sized hydro power generators, have recently been commercialized for common households and small-scale enterprises. In addition, due to the recent liberalization of retail sales of power, many business operators have begun entering power generation business. Thus, multiple options are now available for procuring power in addition to conventional power supply from major power companies.

Meanwhile, the amount of power consumption in common households or many business facilities is monitored by power meters installed at the respective households/facilities. Power charges for common households and small-scale enterprises are usually set by using the peak power consumption amount within a predetermined period (for example, one day) as a reference based on the monitored readings of such power meters, and such charges are then billed from the power companies.

WO2012/81312 discloses, as technology related to the charging of consumed power, a power supply method that charges for supply of power to the respective devices. In this power supply method, the device transmits a request for power supply, a power supplier receives such request and the power supplier that received the request starts transmitting power packets. When the transmission of power packets is started at the power supplier, the device starts receiving the power packets. The device and the power supplier respectively receive and transmit the power packets that go through power routing. The request for power supply contains an address for a power supply destination within the power routing and the power supplier attaches the power supply destination address included in the request to the power packets.

BRIEF SUMMARY OF THE INVENTION

An aspect of the present invention relates to a power information management device. The power information management device is a power information management device directly or indirectly connected to a communication network, identification information is given to the power information management device, the device comprising: wiring that transmits power, a load unit, a power generation unit and a power storage unit being directly or indirectly connectable to the wiring; a power measurement unit that measures an amount and a direction of the power transmitted through the wiring; a power information generation unit that generates, on a predetermined period basis, power information that represents the amount and the direction of the power measured by the power measurement unit; a communication unit that transmits, to the communication network, the power information having attached therewith the identification information given to the power information management device, and receives second power information transmitted from a device different from the power information management device; and an identification information determination unit that determines whether or not identification information attached to the second power information received by the communication unit matches the identification information given to the power information management device, wherein if it is determined that the identification information attached to the second power information fails to match the identification information given to the power information management device, the power information generation unit modifies the power information based on the second power information, and the communication unit transmits the modified power information and the second power information to the communication network.

Another aspect of the present invention relates to a power information management system. The power information management system comprises: a settlement computer that is connected to a communication network; and a plurality of power information management devices, each being given identification information, wherein each of the plurality of power information management devices comprises: wiring that transmits power, a load unit, a power generation unit and a power storage unit being directly or indirectly connectable to the wiring; a power measurement unit that measures an amount and a direction of the power transmitted through the wiring; a power information generation unit that generates, on a predetermined period basis, power information that represents the amount and the direction of the power measured by the power measurement unit; a communication unit that transmits, to the communication network, the power information having attached therewith the identification information given to the power information management device, and receives second power information transmitted from a device different from the power information management device; and an identification information determination unit that determines whether or not identification information attached to the second power information received by the communication unit matches the identification information given to the power information management device, wherein if it is determined that the identification information attached to the second power information fails to match the identification information given to the power information management device, the power information generation unit modifies the power information based on the second power information, and the communication unit transmits the modified power information and the second power information to the communication network.

The above-described and other features, advantages and technical and industrial significance of the present invention, will be better understood by reading the following detailed description of the current preferred embodiments of the present invention while considering the attached drawings.

DETAILED DESCRIPTION OF THE INVENTION

Hereinafter, a power information management device and a power information management system according to embodiments of the present invention will be described with reference to the drawings. It should be noted that the present invention is not limited by these embodiments and that the same reference numbers are denoted to the same parts in the descriptions of the respective drawings.

The power information management device and the power information management system according to the present embodiment are for measuring a supply amount to a power user and a consumption amount at the power user and achieving settlement of power charges and so on.

Here, in many cases, the power (electric power) is generated at power plants and conveyed to consumption areas through power lines. In view of the power loss generated through the power lines, it may be desirable to perform private power generation or reciprocate the generated power among nearby power users in order to shorten the power transmission distance as much as possible. In such case, the nearby power users may become power suppliers or consumers. Thus, a system is needed that is capable of measuring a supply amount or a consumption amount at each of the power users, as well as being capable of achieving easy settlement of power charges among the power users in order to enable power reciprocation among the power users, sometimes as power suppliers and at other times as power consumers. In addition, in order to enable flexible power reciprocation, it may be desirable for the power users to be able to easily participate or withdraw from such system without the need for construction work or cumbersome procedures, etc. and for the system side to be able to change the configuration or scale, in an easy and flexible manner, depending on changes in the power users.

However, currently no system is known that allows for the supply of power to others or settlement of power charges among general power users who are not electric power business operators. Moreover, in the current conditions, extensive and cumbersome work is necessary, such as the laying of an electric power distribution network, in order to draw electric power into new houses.

In the present embodiment, the power information management device and the power information management system that are capable of: measuring a supply amount or a consumption amount at each of the power users; achieving easy settlement of power charges among the power users; and changing the configuration or scale, in an easy and flexible manner, depending on changes in the power users are provided.

Figure 1:
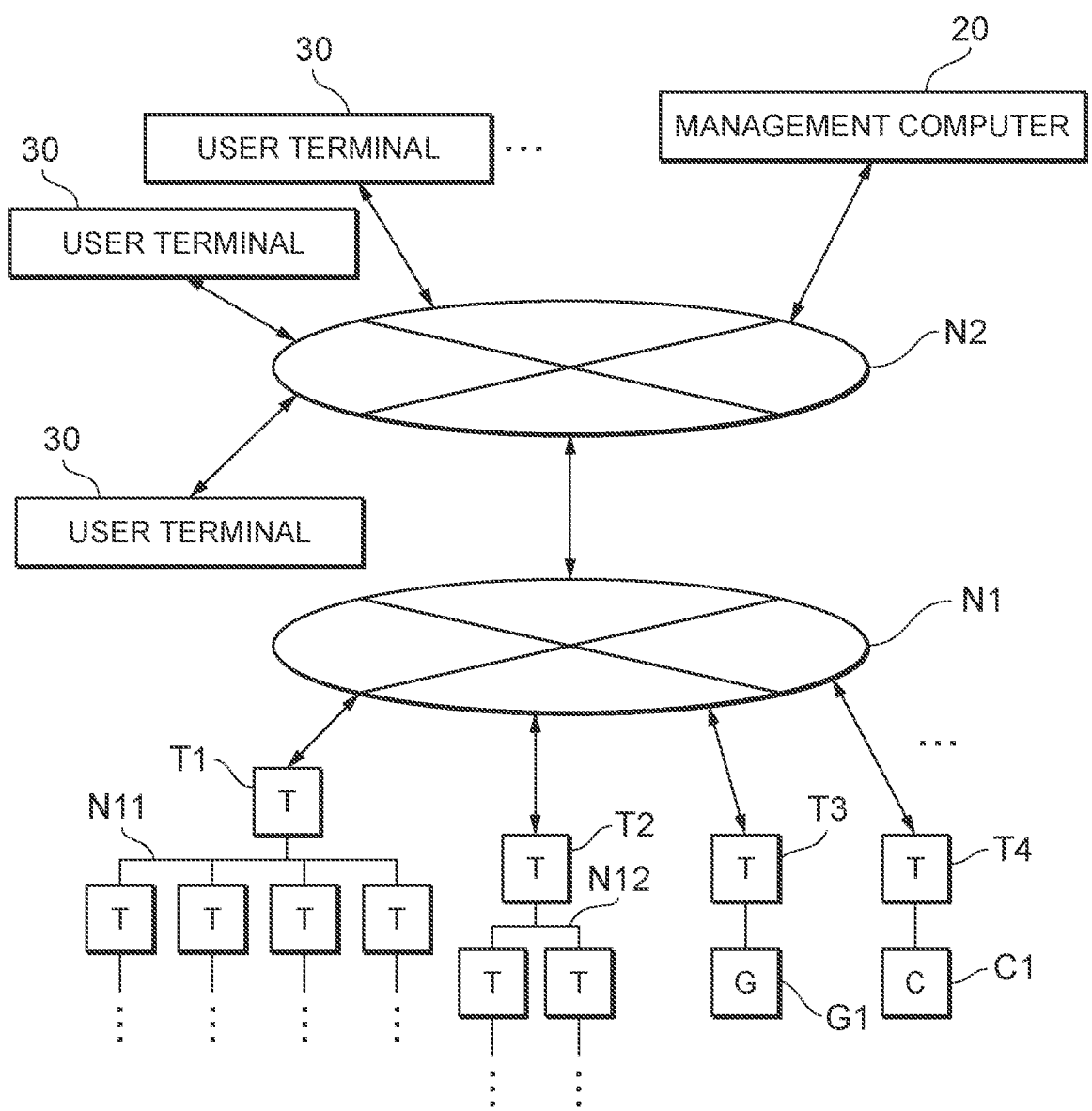
FIG. 1 is a diagram showing a configuration example of a power information management system according to an embodiment of the present invention.

FIG. 1 is a diagram showing a configuration example of a power (electric power) information management system according to an embodiment of the present invention. As shown in FIG. 1, the power information management system 1 according to the present invention is provided with: a plurality of power information management devices T1, T2, . . . connected to a transmission network N1; and a management computer 20 connected to a communication network N2. Moreover, a plurality of power information management devices T11, T12, . . . are connected via transmission networks N11, N12, . . . on the downstream side of some of the power information management devices T1, T2, . . . . In addition, a power generation unit G1 and a load unit C1 are connected on the downstream side of other power information management devices T1, T2, . . . . The power information management devices T1, T2, . . . may hereinafter be collectively referred to as the power information management device T. In addition, in the present embodiment, a side closer to the communication network N2 in relation to each of the power information management devices T will be referred to as the upstream side, and the opposite side will be referred to as the downstream side. Here, in the present embodiment, the load unit means an electrical equipment having at least one resistor and consuming electrical power such as a home electrical appliance, an office automation equipment, or the like.

The transmission networks N1, N11, N12, . . . are formed by commonly-used power lines for transmitting power. The transmission networks N1, N11, N12, . . . may be power distribution networks laid as urban infrastructure, power distribution networks installed in buildings or simply-provided power transmission cords. As described below, the transmission networks N1, N11, N12, . . . may also be used as communication networks that transmit not only power but also information by means of power line communication (PLC).

Communication lines such as Internet lines, telephone lines, mobile communication networks, LANs, Wi-Fi (Wireless Fidelity) or Bluetooth (registered trademark), etc. or any combination of the above may be used for the communication network N2. A plurality of user terminals 30 are connected to the communication network N2 as needed.

The communication network N2 is connected to the transmission network N1 either at all times or as needed. The means for connecting the transmission network N1 and the communication network N2 is not particularly limited, and various means can be contemplated. For example, a communication device may be connected to the transmission network N1, and information received through the power line communication (PLC) may be transmitted to the communication network N2 by means of a wired or wireless communication means and information received by means of a wired or wireless communication means may be transmitted to the transmission network N1 through the power line communication.

Each power information management device T is connected to the transmission networks N1, N11, N12, ..., which may also be used as communication networks, and accordingly, it is indirectly connected to the communication network N2. The power information management device T measures the amount and direction of the power that passes through the power information management device T and transmits measurement information.

Figure 2:
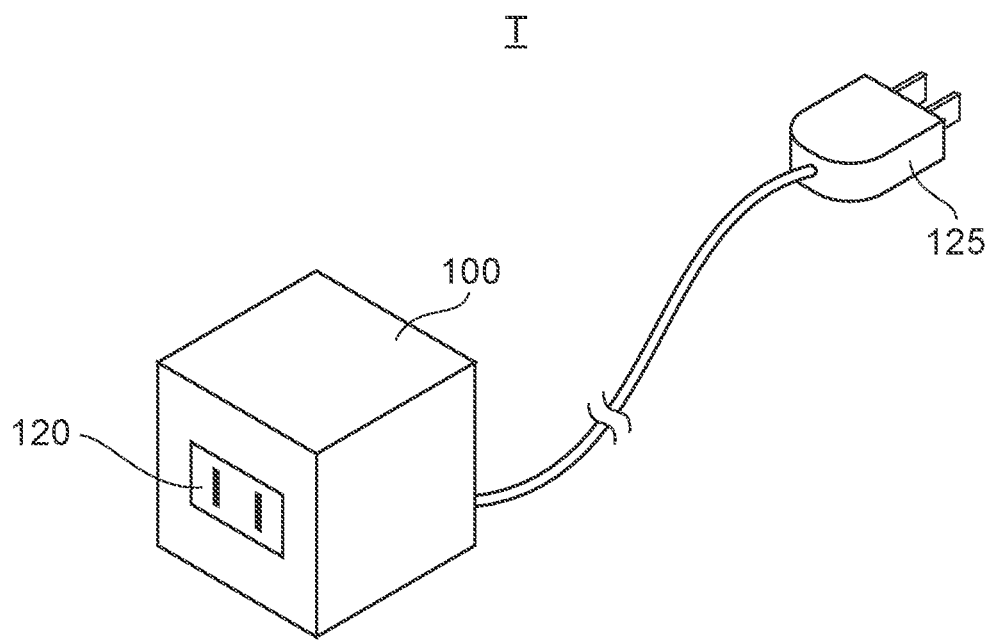
FIG. 2 is a schematic diagram showing an example of the appearance of a power information management device shown in FIG. 1.

FIG. 2 is a schematic diagram showing an example of the appearance of the power information management device T. The power information management device T assumes the shape of a tap provided with a housing 100 and wiring 110. In the present embodiment, the power information management device with the tap shape illustrated in FIG. 2 will be referred to as the "tap" hereinafter.

The housing 100 is provided with an insertion port 120 for inserting a plug of a power supply cord. One end of the wiring 110 is connected to the insertion port 120 inside the housing 100. A socket for power-supplying electrical equipment, such as a home electrical appliance or office automation equipment (i.e. load units that consume power) may be inserted into the insertion port 120. At the other end of the wiring 110, a socket 125 is provided for being inserted into a power supply insertion port provided to a power generation unit, such as a solar power generator, a small-sized hydro power generator or a hand-driven type power generator, etc., or a battery (a power storage unit). This socket 125 can also be inserted into an insertion port of the indoor wiring provided in common households or office buildings.

In other words, any of the load unit, the power generation unit and the power storage unit may be connected to the tap T. Other taps T can also be connected to the tap T via the insertion port 120 and the socket 125. It should be noted that single-phase 100 V insertion port and socket without a ground are illustrated in FIG. 2 as the insertion port 120 and the socket 125; however, the shape of the insertion port 120 and the socket 125 is not limited thereto. In addition, adaptors may be inserted into the insertion port 120 and the socket 125 for connecting a load unit, a power generation unit or a power storage unit that differs in respect of the insertion port standards.

It should be noted that only one insertion port 120 is provided to the tap T shown in FIG. 2; however, two or more insertion ports may be provided. The appearance of the tap T is also not limited to the tap shape shown in FIG. 2. In short, it may be sufficient if the tap T can be connected to the transmission networks N1, N11, N12, ... via the wiring 110.

Figure 3:
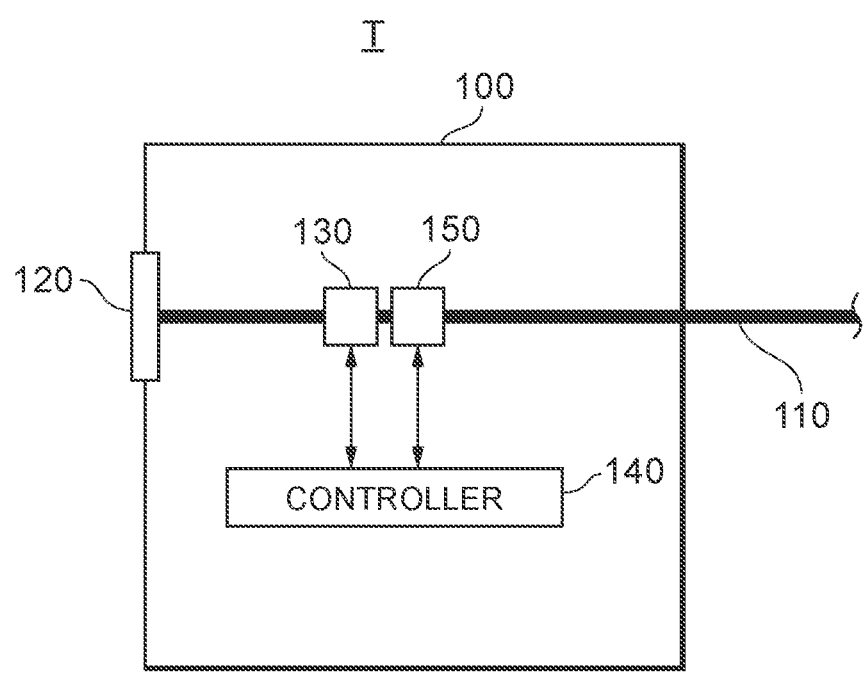
FIG. 3 is a schematic diagram showing an internal configuration of the power information management device shown in FIG. 1.

FIG. 3 is a schematic diagram showing an internal configuration of the tap T. The tap T is provided with the wiring 110, a power measurement unit 130 provided at a predetermined point along the wiring 110, a cutoff device (breaker) 150 and a controller 140.

The power measurement unit 130 measures the amount and direction of the power that passes through the wiring 110 of the tap T.

Figure 4:
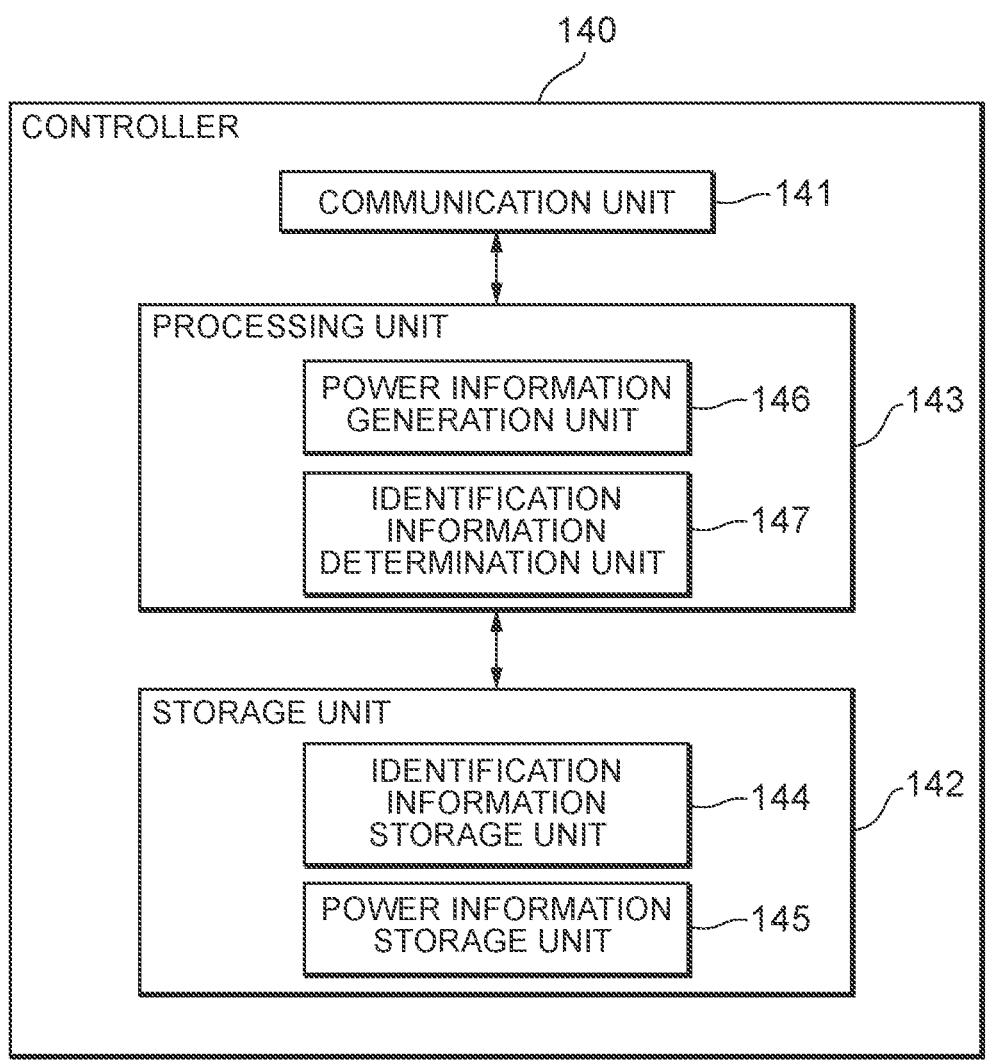
FIG. 4 is a block diagram showing a schematic configuration of a controller shown in FIG. 3.

The controller 140 performs predetermined processing for transmitting the measurement result of the power measurement unit 130 as power information and controls the operation of the cutoff device 150. FIG. 4 is a block diagram showing the schematic configuration of the controller 140. More specifically, the controller 140 is provided with a communication unit 141, a storage unit 142 and a processing unit 143.

The communication unit 141 transmits the power information to the communication network N2, via the transmission networks N1, N11, N12, ..., by means of power line communication (PLC). Here, in addition to the power line communication, a wireless communication function may be provided to the communication unit 141 and, in such case, the transmission network N1 and the communication network N2 may be relayed by means of the tap T provided with the wireless communication function.

The storage unit 142 is configured by a semiconductor memory, etc. such as, for example, ROM, RAM, or the like and stores programs to be executed by the processing unit 143 as well as information used for various processing in the power information management device T. The storage unit 142 includes an identification information storage unit 144 and a power information storage unit 145. Here, identification information unique to a tap (hereinafter, the "tap ID") and an ID unique to a power user (hereinafter, the "user ID"), who is the owner of the tap T, are given to each tap T, and the identification information storage unit 144 stores these tap ID and user ID. The tap ID is basically specific to each tap T, whereas, the user ID is re-writable. It should be noted that the re-writing of the user ID can be performed, as needed, by the management computer 20 or by the user terminal 30 under predetermined conditions. The identification information storage unit 144 may further store a passcode for preventing unauthorized re-writing of the user ID. The power information generated at each tap T is transmitted with at least the user ID being attached thereto.

The power information storage unit 145 temporarily stores the power information transmitted from other taps T when it is input to the tap T.

The processing unit 143 is configured by, for example, a microprocessor and performs various processing by reading the programs stored in the storage unit 142. Function units that are executed by the processing unit 143 include: a power information generation unit 146 and an identification information determination unit 147. The power information generation unit 146 generates, on a predetermined period basis, the power information which is the information indicating the amount and direction of the power measured by the power measurement unit 130. Here, the cycle in which the power information is generated by the power information generation unit 146 is not particularly limited, and it may be every thirty minutes, every minute or every second. The identification information determination unit 147 performs determination of the identification information (user ID) attached to the power information.

Here, the power information transmitted from each tap T is eventually transmitted to the management computer 20 or other related terminal devices, etc. for settlement of power charges. In doing so, the power information transmitted from a tap T may be transmitted via a separate tap T. In such case, at the tap T to which the power information transmitted from another tap T is input, the identification information determination unit 147 determines whether the user ID attached to the input power information matches the user ID given to such tap T. If the user IDs match, the communication unit 141 does not transmit the power information input from the other tap T. On the other hand, if the user IDs fail to match, the power information generation unit 146 modifies the power information generated by itself based on the power information input from the other tap T, and the communication unit 141 transmits the modified power information and the power information input from the other tap T.

Figure 5:
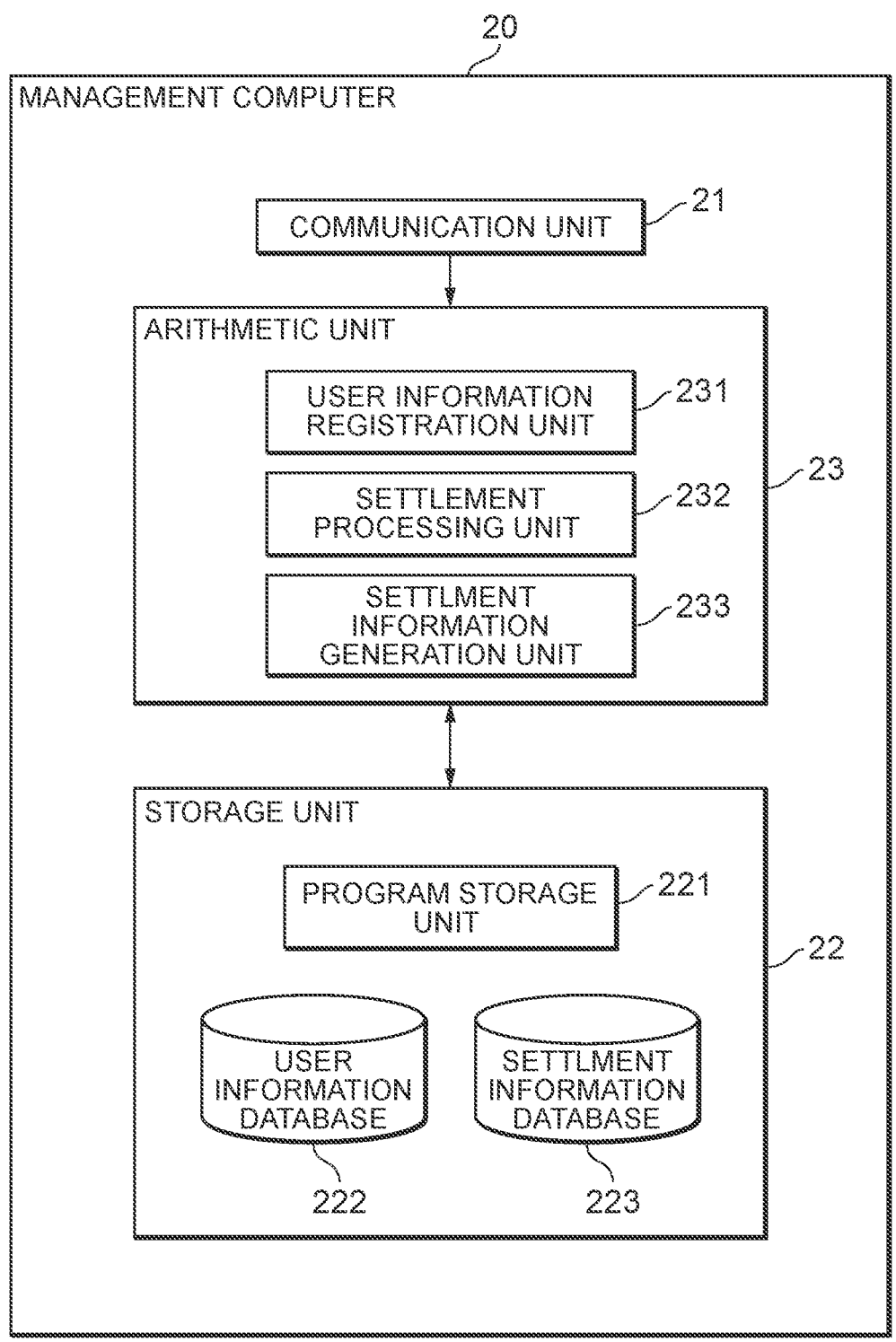
FIG. 5 is a block diagram showing a schematic configuration of a management computer shown in FIG. 1.

FIG. 5 is a block diagram showing the schematic configuration of the management computer 20. In addition to the management of the information related to users that utilize the power information management system 1, the management computer 20 performs settlement of the charges for the power used or generated by the users. As shown in FIG. 5, the management computer 20 is provided with a communication unit 21, a storage unit 22 and an arithmetic unit 23.

The communication unit 21 connects the management computer 20 to the communication network N2 and performs communications with other devices connected to the communication network N2. The communication unit 21 is configured by using, for example, a software modem, a cable modem, a wireless modem, an ADSL modem, etc.

The storage unit 22 is a computer readable storage medium, such as a semiconductor memory including, for example, ROM and RAM, and a hard disk, etc., and includes a program storage unit 221, a user information database 222 and a settlement information database 223.

In addition to an operating system program and a driver program, the program storage unit 221 stores application programs for executing various functions, various parameters used during execution of these programs, and the like.

The user information database 222 stores information (hereinafter, the "user information") related to power users (i.e. the users of the taps T) who utilize the power information management system 1. Examples of the user information include user IDs, usernames, e-mail addresses, addresses, telephone numbers, tap IDs of the taps T owned by the users (i.e. the taps to which the user IDs of the users are given), and the like. Alternatively, credit card numbers or bank account numbers for settlement of the power charges may also be stored as the user information.

The settlement information database 223 stores information related to settlement of power charges for each of the users (hereinafter, the "settlement information"). Examples of the settlement information include the power supply-demand amount during a predetermined period, power charges depending on the power supply-demand amount, point balances used for settlement of the power charges, and the like. Here, when the power amount used exceeds the power amount generated, the power supply-demand amount turns positive, and when the power amount used falls lower than the power amount generated, the power supply-demand amount turns negative. In addition, when the power supply-demand amount turns positive, a payment of power charges is incurred and when the power supply-demand amount turns negative, receipt of power charges is earned. The cycle in which the settlement is performed is not particularly limited, and it may be set to every thirty minutes, every hour, every day, every week, and the like, as needed.

Here, in the present embodiment, the settlement of power charges is carried out through adjustment of points. In other words, when the payment of power charges is incurred, points are subtracted and when the receipt of power charges is earned, points are added. These points may also be purchasable through settlement by credit cards, etc. In addition, the points may be convertible to cash under predetermined rules. It should be noted that the settlement of power charges may not necessarily be performed using the points; for example, the currency in the region where the power information management system 1 is introduced may be used. However, the settlement using the points has an advantage to the effect that the settlement can be performed using common points even among regions with different currencies.

The arithmetic unit 23 is configured by using, for example, a CPU (Central Processing Unit), and performs overall control of the respective units of the management computer 20 by reading various programs stored in the program storage unit 221 and executes various kinds of arithmetic processing for managing the power information generated in the respective taps T of the power information management system 1.

More specifically, the arithmetic unit 23 includes a user information registration unit 231, a settlement processing unit 232 and a settlement information generation unit 233.

The user information registration unit 231 performs processing such as registration of user information related to a new user with the user information database 222 and modification or updating of the registered user information, based on the information transmitted via the communication network N2. The user information may be transmitted as needed from devices, such as a general-purpose computer, a tablet terminal, a smartphone, etc., connected to the communication network N2. As an example, when a user transfers his/her tap T to another user, the tap IDs among the user information of both users are re-written accordingly, each of such tap IDs representing the tap T owned by each user.

The settlement processing unit 232 performs settlement of power charges on a registered user basis at predetermined cycles based on the power information transmitted from the taps T. More specifically, the power supply-demand amount is calculated by cancelling out the power amount used and the power amount supplied on a user basis, and the power charge according to the power supply-demand amount is calculated. The points for settlement are then adjusted depending on the power charges.

The settlement information generation unit 233 generates information according to the settlement processing by the settlement processing unit 232 and transmits it from the communication unit 21. As an example, information such as the current point balance, the power supply-demand amount during a predetermined period, and the like, is generated and transmitted to the respective users. As another example, information for cutting off the power transmission (cutting-off information) is transmitted to a tap T to which a user ID of the user whose points balances is zero or negative is given. At the tap T that receives the cutting-off information, the controller 140 controls the cutoff device 150 to cut off the power transmission.

It should be noted that only one management computer 20 is shown in FIG. 1; however, a plurality of management computers may be provided. In addition, the functions of the management computer 20 may not necessarily be configured with only a single computer and they may instead be configured with a plurality of computers connected to the communication network N2. For example, the settlement information stored in the settlement information database 223 may be held in a distributed manner by a plurality of computers or it may be shared among the plurality of computers. A so-called blockchain mechanism may be utilized to manage the settlement information by the entire power information management system 1.

The user terminal 30 is a terminal device having a communication function, such as a desktop or notebook personal computer, a tablet terminal, a smartphone, etc. The user terminal 30 is used for various kinds of processing such as registration or updating of the user information to the user information database 222, confirmation of the point balance and purchase of the points.

Next, the configuration and operation on the downstream side of the taps T1, T2, . . . will be described. The configuration on the downstream side of the taps T1, T2, . . . is not particularly limited. For example, as in a tap T3, a power generation unit G1 may be connected. In this case, the tap T3 supplies the power generated by the power generation unit G1 to other devices via the transmission network N1 and transmits the power information that represents the power amount supplied by the power generation unit G1. As in a tap T4, a load unit C1 may be connected. In this case, the tap T4 receives the supply of power via the transmission network N1 and transmits the power information that represents the amount of power consumed by the load unit C1.

Alternatively, as in the taps T1, T2, a plurality of taps T11, T12, . . . , T21, T22, . . . may further be connected, and a power generation unit, a load unit or a power storage unit may be connected following such plurality of taps.

Figure 6:
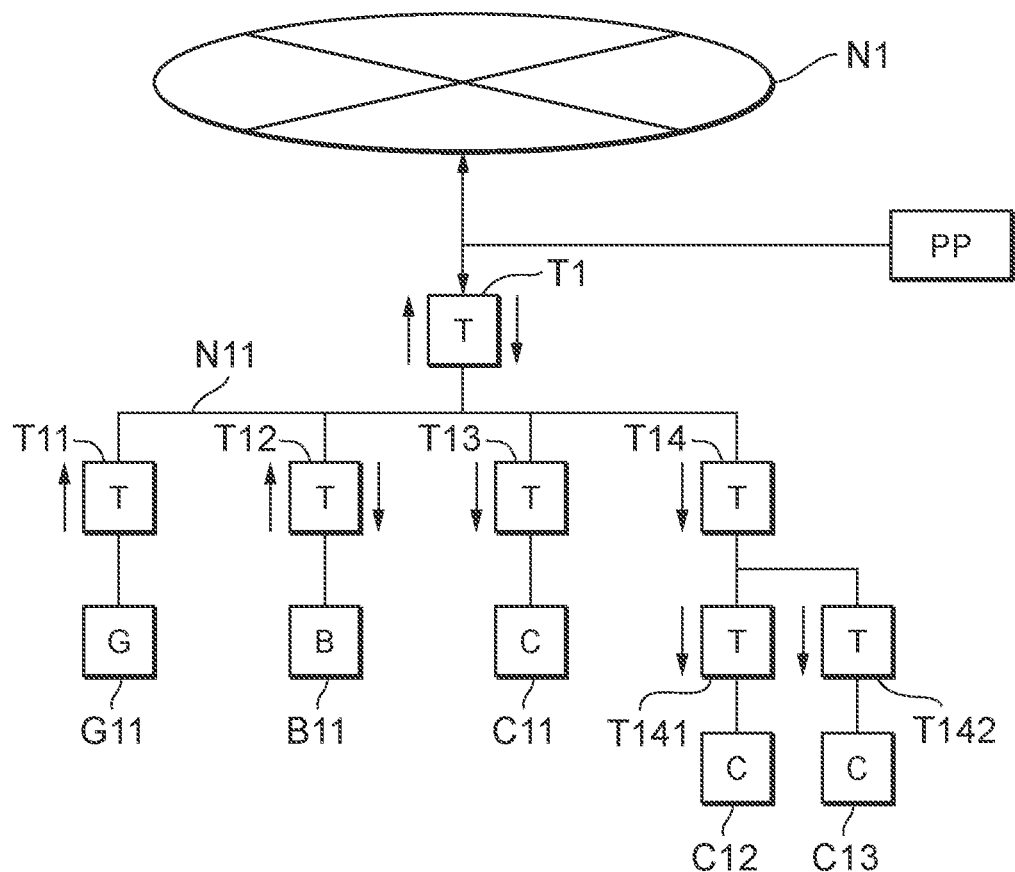
FIG. 6 is a schematic diagram showing an example of a configuration on the downstream side of a tap shown in FIG. 1.

FIG. 6 is a schematic diagram showing an example of the configuration on the downstream side of the tap T1. Taps T11 to T14 are connected downstream of the tap T1. It should be noted that the arrows indicated near the respective taps T show directions of the power flowing through the relevant taps T. It is also assumed that each of the taps T shown in FIG. 1 is given an identical user ID. This is a configuration example in which a common household provided with, for example, a private power generator and including family members who share the family budget, is assumed.

A power generation unit G11 is connected to the tap T11, a power storage unit B11 is connected to the tap T12 and a load unit C11 is connected to the tap T13. Two taps T141, T142 are further connected on the downstream side of the tap T14 and load units C12, C13 are respectively connected to the taps T141, T142. In such configuration, the power generated at the power generation unit G11 is transmitted to the transmission network N11 via the tap T11 and transmitted to and consumed at the load units C11, C12, C13 via the taps T13, T14, T141, T142.

When there is no load on the load units C11, C12, C13, the power transmitted to the transmission network N11 is stored in the power storage unit B11. The stored power is consumed at the load units C11, C12, C13 when the power generation unit G11 is not in operation. Further, when the power storage unit B11 becomes full, the power generated by the power generation unit G11 is supplied to the transmission network N1 through the tap T1.

In contrast, when the amount of power generated by the power generation unit G11 is insufficient for the loads on the load units C11, C12, C13, the power is supplied to the load units C11, C12, C13 from the transmission network N1 via the tap T1. In this case, power that is sold by a power business operator (power plant PP) may be supplied.

The tap T1 generates and transmits power information that represents the amount and direction of the power that passed itself; namely, the power supplied via the transmission network N11 when the power on the downstream side is insufficient or the power supplied to the transmission network N11 when the power on the downstream side is surplus. Accordingly, the settlement based on the power information transmitted from the tap T1 is performed on the management computer 20, etc.

On the other hand, the taps T11 to T14 also generate and transmit power information that represents the amount and direction of the power that passed themselves. However, since the taps T11 to T14 are given the same user ID as the tap T1, the power information transmitted from the taps T11 to T14 is not transmitted to the upstream side of the tap T1. The same applies to the taps T141 and T142. Accordingly, double-counting of the power amount among taps T with an identical user ID can be prevented.

Figure 7:
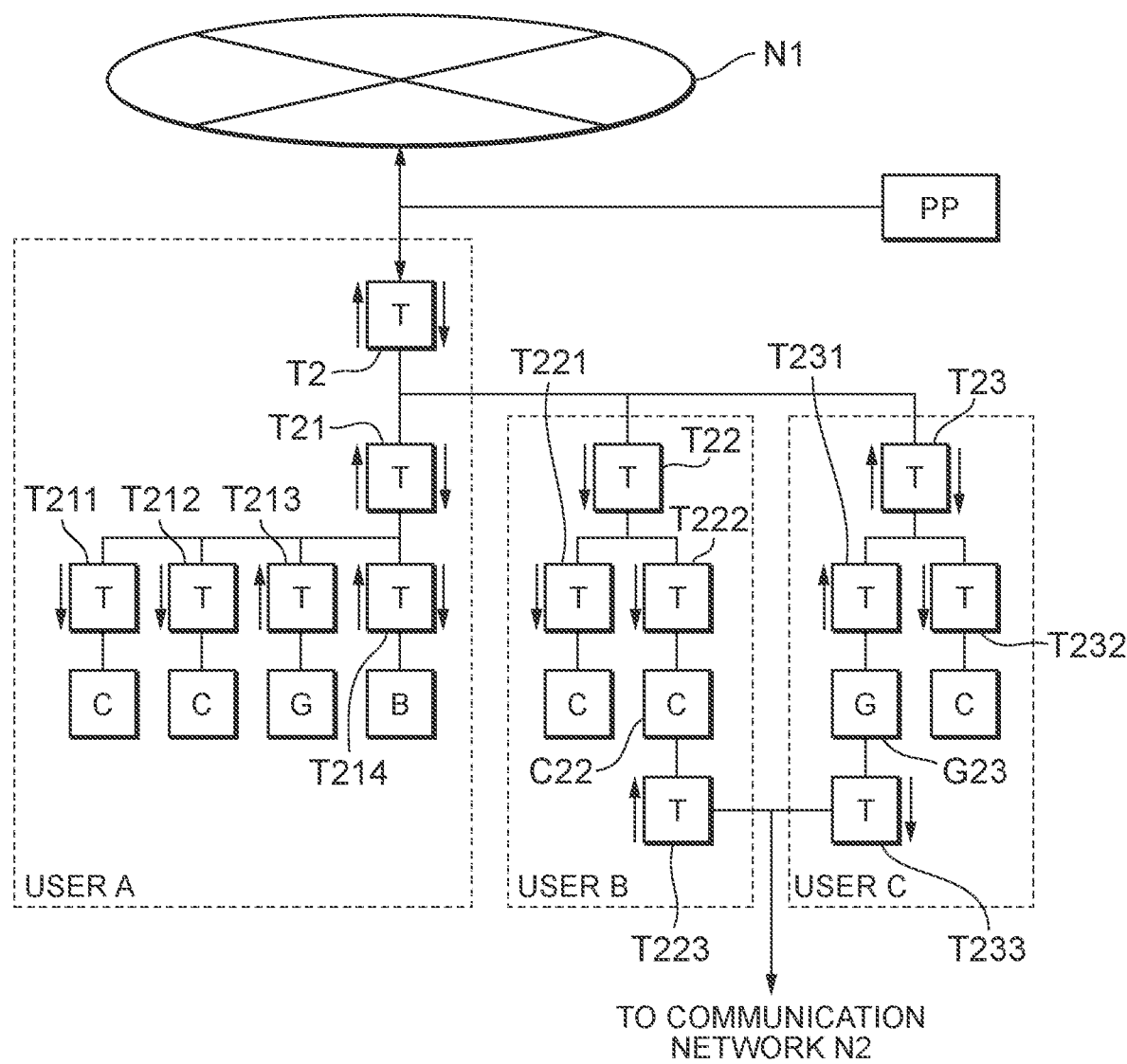
FIG. 7 is a schematic diagram showing another example of the configuration on the downstream side of the tap shown in FIG. 1.

FIG. 7 is a schematic diagram showing an example of the configuration on the downstream side of the tap T2. As shown in FIG. 7, taps T21, T22, T23 are connected downstream of the tap T2 and a plurality of taps T are further connected downstream of the respective taps T21, T22, T23. Here, it is assumed that the taps T2, T21, T211, T212, T213, T214 are given an identical user ID (for example, the user ID of a user A), the taps T22, T221, T222, T223 are given a different user ID (for example, the user ID of a user B) and the taps T23, T231, T232, T233 are given a further different user ID (for example, the user ID of a user C). This is a configuration example in which a case is assumed where, for example, a plurality of users, who do not share the family budget, are living in collective housing or sharing one and the same house. The user A is, for example, a landlord.

The operation among the taps T given the identical user ID is as described above.

When the power information is transmitted from the tap T22, this power information is input to the tap T2 once. At the tap T2, it is determined that the user ID (i.e. the user ID of the user B) attached to the input power information is different from the user ID (i.e. the user ID of the user A) given to the tap T2. The tap T2 then modifies (i.e. subtracts the power amount in the same direction) the power information generated by itself based on the power information input from the tap T22, and transmits the modified power information and the power information input from the tap T22. Accordingly, this enables to avoid mixing of the power information between the taps T with different users.

In addition to the tap T222 connected to the tap T22, another tap T223 is connected to the load unit C22. Further, in addition to the tap T231 connected to the tap T23, another tap T233 is connected to the power generation unit G23. By connecting these taps T223, T233 to each other, the power can be directly supplied from the power generation unit G23 to the load unit C22. Further, by connecting the taps T223, T233 to the communication network N2 via a network different from the transmission network N12, it is also possible to perform settlement for the power transaction between the load unit C22 and the power generation unit G23.

According to the present embodiment, by configuring a power transmission network using a power information management device that is provided with wiring to which a load unit, a power generation unit and a power storage unit are directly or indirectly connectable and that measures an amount and a direction of the power transmitted through this wiring to generate and transmit power information to the communication network, a supply amount or a consumption amount at each power user can be measured, easy settlement of power charges can be performed among the power users, and the configuration and scale can be changed in an easy and flexible manner depending on changes in the power users.

More specifically, according to the power information management system 1 related to the present embodiment as described above, private power generation and sharing of power among nearby power users can be started on a small scale by using a tap T, the configuration of the system can be changed freely and can be expanded in an unlimited manner. In addition, the settlement of power charges according to the power usage (supplied amount) can be easily performed regardless of the system scale. Accordingly, it may be possible to introduce a system in which, first, private power generation is started from a common household and then the scale is gradually expanded to nearby regions, or a business operator may introduce a system common to business facilities scattered across the regions. Alternatively, the power information management system 1 may also be applied to the case where each person is to pay the power charges separately at a household, in a shared room, or the like.

In addition, according to the present embodiment, even when a contract has been made with a major power business operator for stable power supply, the power information management system 1 can still be easily introduced by making use of the taps T.

Here, the power charges calculated by the power business operator are generally set based on the charge that conforms to the highest power consumption amount during a predetermined period (for example, one day). Therefore, when the power consumption concentrates on a particular time period of the day, the charge that is set may become expensive despite the total amount or the average value of power consumption not being so large. In contrast, according to the present embodiment, the power amount is measured by a shorter unit than before, such as one minute, and the power charges are incurred according to the power amount that is actually consumed, thus, this is reasonable for the power users. Moreover, the time required from the use of power to the settlement can be made significantly shorter than before (for example, a few seconds to a few minutes, depending on the settings).

The power information management system 1 according to such present embodiment can be easily introduced in regions that lack sufficient power infrastructure, such as developing countries, and it can therefore be utilized as a new form of power infrastructure. In particular, it may be sufficient to prepare a power generator, such as a solar power generator or a wind power generator, a tap T and wiring connectable to the tap T, and to provide a wireless communication function to a communication unit 141 of at least one tap T. Accordingly, people in a particular region can utilize the power generated by the power generator and perform settlement of the power charges according to the usage. It may only be necessary to increase connection of wiring by the taps T in order to expand the power information management system 1.

Further advantages and modifications may be easily conceived of by those skilled in the art. Accordingly, from a wider standpoint, the present invention is not limited to the particular details and representative embodiments described herein. Accordingly, various modifications can be made without departing from the spirit or scope of the general idea of the invention defined by the appended claims and equivalents thereof.

What is claimed is:

1. A power information management device directly or indirectly connected to a communication network, the power information management device being used for a power information management system including a settlement computer that is connected to the communication network and a plurality of power information management devices directly or indirectly connected to the communication network,
wherein identification information, which is unique to one of registered users for the power information management system, is given to the power information management device, and settlement is performed for the one of registered users,
wherein the power information management device comprises:
wiring that transmits power, a load unit, a power generation unit and a power storage unit being directly or indirectly connectable to the wiring;
a power measurement unit that measures an amount and a direction of the power transmitted through the wiring;
a power information generation unit that generates, on a predetermined period basis, power information that represents the amount and the direction of the power measured by the power measurement unit;
a communication unit that transmits, to the communication network, the power information having attached therewith the identification information given to the power information management device, and receives second power information transmitted from a device different from the power information management device; and
an identification information determination unit that determines whether or not identification information attached to the second power information received by the communication unit matches the identification information given to the power information management device,
wherein:
if it is determined that the identification information attached to the second power information fails to match the identification information given to the power information management device, the power information generation unit modifies the power information based on the second power information, and the communication unit transmits the modified power information and the second power information to the settlement computer through the communication network; and
if it is determined that the identification information attached to the second power information matches the identification information given to the power information management device, the communication unit transmits the power information without modification to the settlement computer through the communication network and does not transmit the second power information.

2. The power information management device according to claim 1, further comprising:
a cutoff device that cuts off the transmission of the power through the wiring when particular information is input via the communication network.

3. The power information management device according to claim 1, wherein
the communication unit transmits the power information via the wiring.

4. The power information management device according to claim 1, further comprising a housing provided with an insertion port for inserting a plug of a power supply cord connected to a load unit that consumes power,
wherein an end of the wiring is connected to the insertion port inside of the housing.

5. The power information management device according to claim 4, further comprising, at another end of the wiring, a socket configured to be inserted into a power supply insertion port of a power generator or a battery.

6. The power information management device according to claim 1,
wherein:
if it is determined that the identification information attached to the second power information fails to match the identification information given to the power information management device, the settlement computer stores the modified power information and the second power information transmitted by the communication unit.

7. A power information management system, comprising:
a settlement computer that is connected to a communication network; and
a plurality of power information management devices, each being given identification information, wherein
each of the plurality of power information management devices comprises:
wiring that transmits power, a load unit, a power generation unit and a power storage unit being directly or indirectly connectable to the wiring;
a power measurement unit that measures an amount and a direction of the power transmitted through the wiring;
a power information generation unit that generates, on a predetermined period basis, power information that represents the amount and the direction of the power measured by the power measurement unit;
a communication unit that transmits, to the communication network, the power information having attached therewith the identification information given to the power information management device, and receives second power information transmitted from a device different from the power information management device; and
an identification information determination unit that determines whether or not identification information attached to the second power information received by the communication unit matches the identification information given to the power information management device,
wherein:
if it is determined that the identification information attached to the second power information fails to match the identification information given to the power information management device, the power information generation unit modifies the power information based on the second power information, and the communication unit transmits the modified power information and the second power information to the settlement computer through the communication network; and
if it is determined that the identification information attached to the second power information matches the identification information given to the power information management device, the communication unit transmits the power information without modification to the settlement computer through the communication network and does not transmit the second power information, and
wherein the identification information is unique to each of registered users for the power information management system, and settlement is performed based on each of the registered users.

8. The power information management system according to claim 7, wherein
identification information for identifying owners of the respective power information management devices is given to each of the plurality of power information management devices,
the plurality of power information management devices transmit the identification information given to each of the plurality of power information management devices as attached information of the power information, and
the settlement computer performs the settlement on a basis of the identification information attached to the power information.

9. The power information management system according to claim 7, wherein
the settlement computer performs the settlement by cancelling out a power supply amount and a power consumption amount based on the power information.

10. The power information management system according to claim 7,
wherein:
if it is determined that the identification information attached to the second power information fails to match the identification information given to the power information management device, the settlement computer stores the modified power information and the second power information transmitted by the communication unit.

11. The power information management device according to claim 6,
wherein the settlement computer
cancels out the power amount used and the power amount supplied on a user basis, based on the modified power information and the second power information stored the settlement computer; and
generates settlement information of each of the registered users.

12. The power information management system according to claim 10,
wherein the settlement computer
cancels out the power amount used and the power amount supplied on a user basis, based on the modified power information and the second power information stored the settlement computer; and
generates settlement information of each of the registered users.

* * * * *